No. 730,632. PATENTED JUNE 9, 1903.
C. E. GALBREATH.
RAKE ATTACHMENT FOR HARVESTER REELS.
APPLICATION FILED JULY 28, 1902.
NO MODEL. 2 SHEETS—SHEET 1.
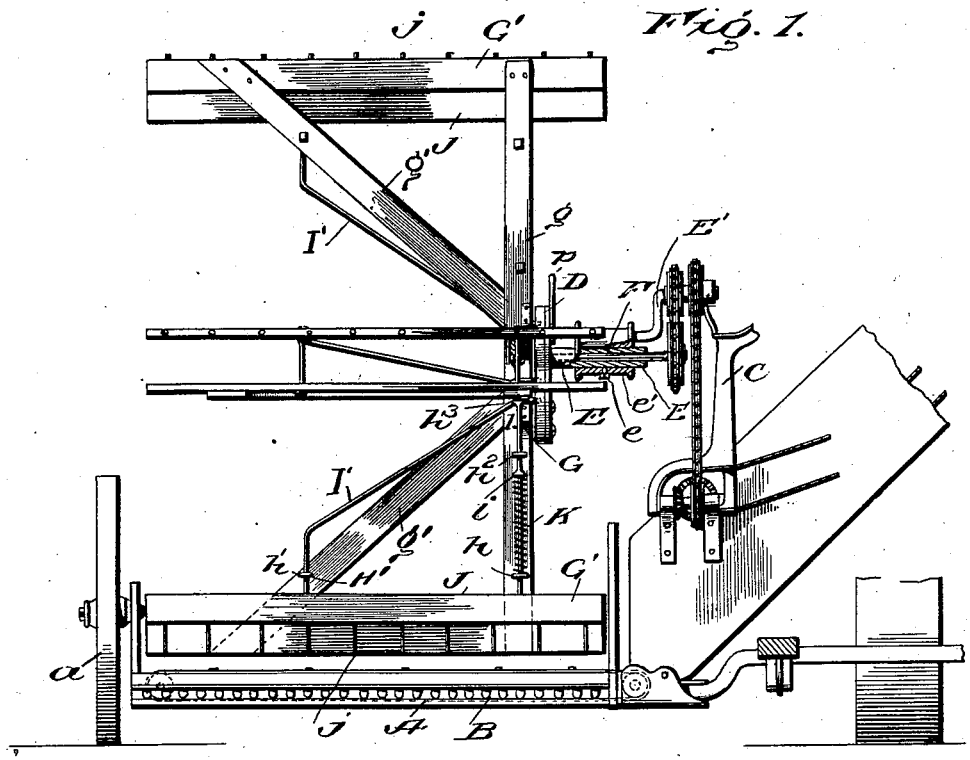
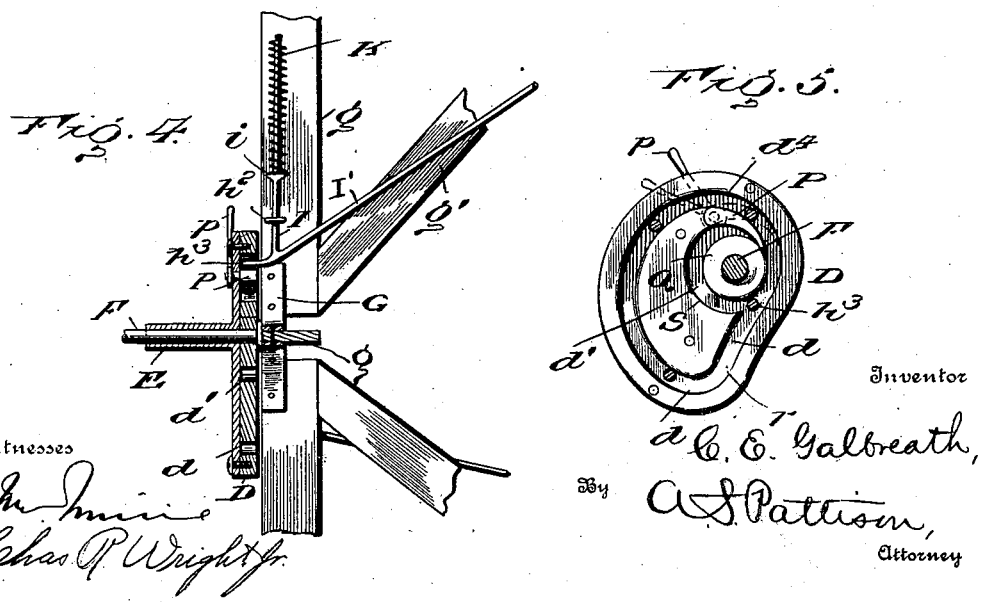
Witnesses
Inventor
C. E. Galbreath,
By A. S. Pattison,
Attorney No. 730,632. PATENTED JUNE 9, 1903.
C. E. GALBREATH.
RAKE ATTACHMENT FOR HARVESTER REELS.
APPLICATION FILED JULY 28, 1902.
NO MODEL. 2 SHEETS—SHEET 2.
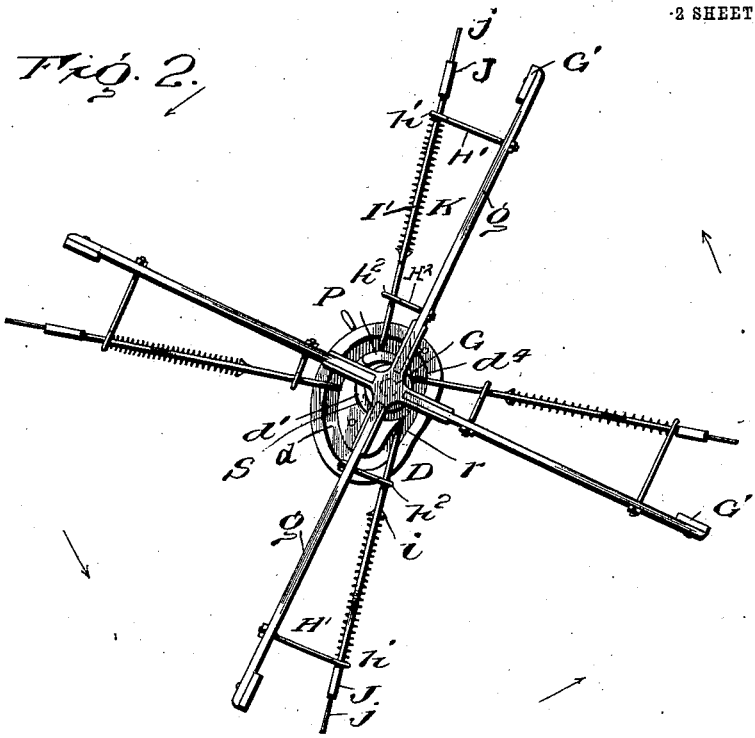
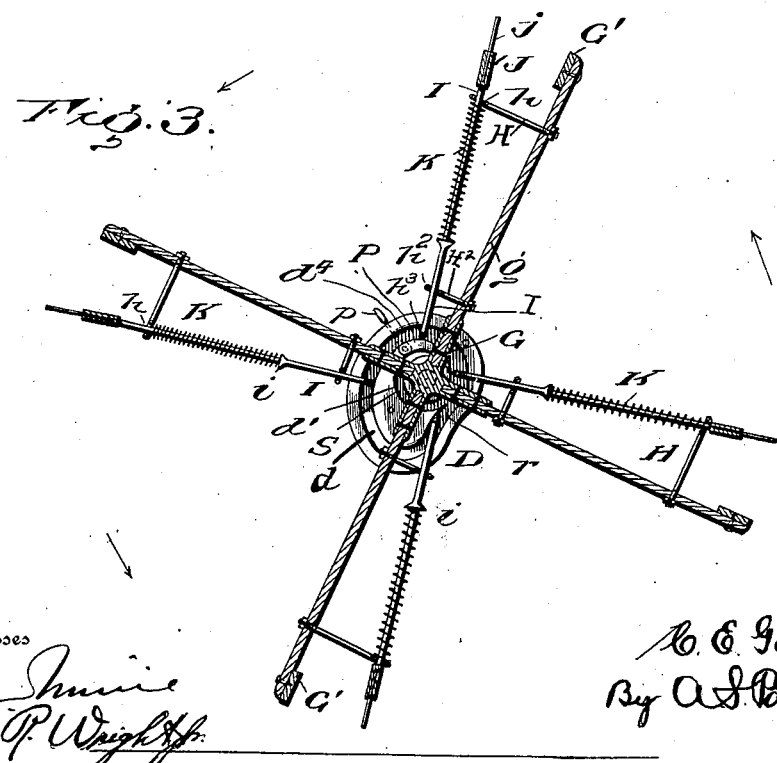
Witnesses
Inventor
C. E. Galbreath,
By A. S. Pattison,
Attorney No. 730,632. Patented June 9, 1903.

UNITED STATES PATENT OFFICE.

CHARLES E. GALBREATH, OF ST. PAUL, KANSAS, ASSIGNOR OF ONE-HALF TO JAMES A. BROGAN, OF ST. PAUL, KANSAS.

RAKE ATTACHMENT FOR HARVESTER-REELS.

SPECIFICATION forming part of Letters Patent No. 730,632, dated June 9, 1903.

Application filed July 28, 1902. Serial No. 117,416. (No model.)

*To all whom it may concern:*

Be it known that I, CHARLES E. GALBREATH, a citizen of the United States, residing at St. Paul, in the county of Neosho and State of Kansas, have invented new and useful Improvements in Rake Attachments for Harvester-Reels, of which the following is a specification.

My invention relates to improvements in rake attachments for harvester-reels, and more particularly pertains to an attachment which is readily attached to any reel used on the ordinary harvester of to-day.

The object of my invention is to provide a rake attachment in which the fingers of the rake extend below the edge of the reel and thus raise the fallen or down grain; but said fingers are adapted to be drawn up just before they come opposite the cutter.

Another object of my invention is to provide means whereby the fingers at all times are held up above the edges of the reel-bars, as it is not necessary that the fingers extend below the reel-bars when the grain is standing in a perfectly-erect position.

A still further object of my invention is to provide a simple, cheap, and effective device to accomplish the above results.

In the accompanying drawings, Figure 1 is a rear view of a harvester, showing my reel attached thereto. Fig. 2 is an end view of my reel. Fig. 3 is a transverse sectional view of my reel. Fig. 4 is an enlarged longitudinal sectional view of my reel, partly broken away. Fig. 5 is an enlarged view of my cam, showing the two operating-grooves and the switch-frog.

Referring now to the drawings, A represents the frame or platform of a harvester, which is supported at its outer end by the wheel $a$. The forward end of said main frame or platform A is provided with the usual reciprocating cutter-bar B, by means of which the grain is cut and adapted to fall upon the platform. Extending at right angles to said platform is the upwardly-extending inclined conveyer, which is adapted to receive the grain from the platform and convey it into a receptacle or wagon adapted to travel along with the harvester.

Adjacent the forward inner end of the platform A is the upwardly-extending standard C, which in the ordinary harvester has the reel journaled therein and which is adapted to rotate therein. The reel is adapted to engage the grain as it is standing and force it in a vertical position against the cutter-bar and by means of which the grain is more readily cut. In my device I provide the upwardly-extending member C with an arm E', which has rigidly secured thereto the block $e'$, which has at its lower end a transverse opening through which passes the sleeve E, rigidly connected to the cam D, and a set-screw $e$ passes transversely through the block $e'$ and is adapted to engage the sleeve E' and hold it in any desired position. The said sleeve E' is provided with a cam D, having a cam-groove $d$ and a circular groove $d'$, hereinafter more fully described. Rotatably mounted in said sleeve is the reel journal or shaft F, which carries at its outer end means by which the said shaft is driven, which might be either a belt, chain, or beveled gears, as this forms no part of my invention, but is driven when the harvester is put in motion. The reel proper may be of any desired structure, but preferably of that shown in the drawings. Said construction consists of a hub G, rigidly mounted upon the shaft F, provided with the radially-extending arm, to which are secured the spokes $g$ of the reel, and any desired number of said spokes may be used, according to the number of arms on the hub. Rigidly secured to the outer end of said spokes are the outwardly-extending reel-blades G', which are at right angles to the spokes and of a length to extend entirely across the platform, thus forcing the grain against the entire cutting-surface of the cutter-bar. The outer ends of the said reel-blades G' have secured thereto the oblique brace-rods $g'$, which have their inner ends secured to the spokes $g$ adjacent the arms or hub G, and thus firmly bracing the reel-arms G'. While I have shown but four spokes $g$, the reel can be made with any desired number. The outer end of the spokes and the brace-rods are provided with the transverse bars H and H', provided at their outer ends with the eyes $h$ and $h'$, and passing through said eye $h$ is the rod I, and passing through the eye $h'$ is the rod I', said rods supporting at their outer ends the bar J, carrying the rake-teeth $j$, said bar extending parallel with the reel-arm G'. The inner end of the spoke $g'$ is provided with a transverse bar or rod $H^2$, which has at its outer end an eye $h^2$, through which the rod I passes, and said rod is turned at right angles at $h^3$ and enters the cam slot or groove $d$. The said rod has a coil-spring K surrounding its outer end, and one end of said spring bears against the eye $h$, and the inner end bears against the lug $i$, carried by the rod, and the normal tendency of said spring is to hold the arms $h^3$ down within the cam-groove $d$, and each one of said arms of the reel is provided with a rake similarly controlled. The arm or plate D is normally in the position shown in Fig. 3, and as the inwardly-turned ends $h^3$ of the rods travel in the cam $d$ it will be readily seen that the tooth-carrying bars are drawn in and out, as the case might be. The said cam slot or recess $d$ is provided with the vertical portion $r$ and the rounded or arch-shaped portion $d^4$, and as the blades of the reel come around in a horizontal position toward the front of the platform the inwardly-turned ends $h^3$ of the rods are gradually forced outward until the teeth carried thereby extend a considerable distance below the lower end of the reel. This will enable said rake-teeth to engage and raise any fallen or down grain, and as the said teeth come close to the cutter-bar the upper inwardly-turned end of said rod has come opposite the straight groove and said arm is retracted by the spring and the rake-teeth drawn back, so that the outer end thereof is about even with the lower edge of the reel-bars. By this construction it will be readily seen that the down grain is more readily raised and brought in contact with the center bar and said teeth retracted at a moment just previous to the striking of said teeth against the cutter-bar, and thus allowing the reel to just pass the said cutter-bar.

As before stated, in order to change the upward movement of the rake-teeth in relation with the cutter-bar I pivotally mount the sleeve E, carrying the cam D, in the standard C, which is held in the adjusted position by the set-screw $e$.

When it is desired to simply use the reel for forcing the grain against the cutter-bar, I provide an annular recess or groove S. Surrounding the sleeve is a semicircular groove $d'$, and pivotally mounted adjacent the upper end of the said semicircular groove is a circular frog P, which is provided with an operating-lever $p$ on the opposite side of the cam member D. The normal position of said frog is the position shown in full lines in Fig. 6, which completes the inner wall of the cam-groove, together with the circular hub Q, which surrounds the sleeve E. When it is desired that only the reel itself should operate on the grain in cases when the grain is standing erect, I move the operating-lever, throwing the frog P in the position shown in dotted lines, Fig. 6, thus causing the inwardly-extending arms $h^3$ of the rods to travel with the circular groove or recess $d'$ formed by the semicircular groove S, the frog P, and the portion R of the cam-groove $d$. The springs carried by the outer ends of the rods have a tendency to force the rod in, and thus the rods are retained with the grooves, and the rake-teeth are at all times retained in their normal retracted position, thus allowing the reel to act wholly upon the grain.

Having thus described my invention, what I claim, and desire to secure by Letters Patent, is—

1. The combination with a harvester-reel, a stationary cam adjacent the hub of said reel, of radially-extending reciprocating arms engaging said cam, and tooth-bars rigidly connected to the outer ends of said arms, substantially as described.

2. The combination with a harvester-reel, a stationary cam adjacent the hub of said reel, of radially-extending reciprocating arms having inwardly-turned ends engaging said cam, and tooth-bars rigidly connected to the outer ends of said arms, substantially as described.

3. The combination with a harvester-reel, a stationary cam adjacent the hub of said reel, of radially-extending reciprocating arms carried by the reel, laterally-extending members carried by said arms and engaging said cam, and laterally-extending tooth-bars rigidly connected to the outer ends of said arms, substantially as described.

4. The combination with a harvester-reel, of a plate adjacent the hub of said reel and having a cam and a circular groove therein, arms normally outwardly spring-pressed traveling in one of said grooves, means for causing said arms to travel in either of said grooves and tooth-bars carried by the outer ends of said arms, substantially as described.

5. The combination with a harvester-reel, of an adjustable plate adjacent the hub of said reel and having a cam and a circular groove therein, arms traveling in one of said grooves, tooth-bars rigidly connected to the outer ends of said arms, and means for causing said arms to travel in either of said grooves, substantially as described.

6. The combination with a harvester-reel, of an adjustable plate adjacent the hub of said reel and having a cam and circular grooves therein communicating with each other, arms traveling in one of said grooves, a frog adapted to throw said arms from one groove to the other, and tooth-bars rigidly connected to the outer ends of said arms, substantially as described.

7. The combination with a harvester-reel consisting of radially-extending arms having horizontally-extending members, eyes carried by said radially-extending members, rods passing through said eyes, horizontally-arranged tooth-bars carried by the outer ends of said rods, springs normally holding said tooth-bars inwardly a plate adjacent the hub of said reel and having a cam-groove and adapted to receive the inner ends of said rods, substantially as described.

9. The combination with a harvester-reel, consisting of radially-extending arms having horizontally-extending members, eyes carried by said radially-extending members, rods passing through said eyes, horizontally-arranged tooth-bars carried by the outer ends of said rods, springs normally holding said tooth-bars inwardly, a plate adjacent the hub of said reel and having a cam-goove and a circular groove therein, laterally-turned members carried by said rods and adapted to enter one of said grooves, and a frog adapted to throw said members in either groove, substantially as described.

9. The combination with a harvester-reel, consisting of radially-extending arms having horizontally-extending members, eyes carried by said radially-extending members, rods passing through said eyes, lugs carried by said rods intermediate the eyes, a spring between said lugs and the outer eyes normally holding the rods inwardly, tooth-bars carried by the outer end of said rods, a plate adjacent the hub of said reel, a cam and a circular groove therein and in communication with each other, laterally-turned ends carried by said rods and entering one of said grooves, and a frog adapted to throw said laterally-extending members in either groove, substantially as described.

10. The combination with a harvester-reel, consisting of radially-extending arms having horizontally-extending members, eyes carried by said arms, bifurcated members reciprocating in said eyes, tooth-bars rigidly secured to the outer ends of said bifurcated members, and a cam adjacent the hub of said reel and adapted to reciprocate said bifurcated member, substantially as described.

11. The combination with a harvester-reel, consisting of radially-extending arms having horizontally-extending members, eyes carried by said arms, bifurcated members reciprocating in said eyes, tooth-bars rigidly secured to the outer ends of said bifurcated members, and a plate adjacent the hub of said reel and having a cam-groove adapted to receive the inner ends of said bifurcated arms, substantially as described.

12. The combination with a harvester-reel having a shaft rotatably mounted in a sleeve, said sleeve rotatably mounted in a rigid member, a set-screw extending through said rigidly-mounted member and engaging said sleeve, a cam member rigidly carried by said sleeve and having a cam and circular grooves therein, outwardly-spring-pressed arms carried by said reel and having their inner ends entering one of said grooves and means for causing said arms to travel in either of said grooves.

In testimony whereof I have hereunto set my hand in the presence of two subscribing witnesses.

CHARLES E. GALBREATH.

Witnesses:
WILLIAM P. MASON,
HENRY H. NULL.